United States Patent [19]

Schmidt

[11] 4,216,617
[45] Aug. 12, 1980

[54] INSTALLATION AND METHOD FOR VEGETABLE CULTIVATION

[75] Inventor: Maria Schmidt, Grottaferrata, Italy

[73] Assignee: Inzuki Buero Fuer Technische Projekte und Patente Aktiengesellschaft, Schaan, Liechtenstein

[21] Appl. No.: 15,594

[22] Filed: Feb. 27, 1979

[30] Foreign Application Priority Data

Feb. 27, 1978 [IT] Italy ............................... 48209 A/78

[51] Int. Cl.$^2$ .............................................. A01G 31/02
[52] U.S. Cl. .......................................... 47/62; 47/65; 47/82
[58] Field of Search ............................. 47/59, 62–65, 47/82–83

[56] References Cited

U.S. PATENT DOCUMENTS

| | | | |
|---|---|---|---|
| 3,030,735 | 4/1962 | Bodkins | 47/83 X |
| 3,293,798 | 12/1966 | Johnson | 47/83 |
| 3,667,157 | 6/1972 | Longhini | 47/82 X |
| 4,006,559 | 2/1978 | Carlyon | 47/82 X |
| 4,033,072 | 7/1977 | Kobayashi et al. | 47/62 |

FOREIGN PATENT DOCUMENTS 1388537 12/1964 France ......................... 47/83

Primary Examiner—Robert E. Bagwill
Attorney, Agent, or Firm—Brisebois & Kruger

[57] ABSTRACT

In an installation for continuous vegetable cultivation by the hydroponic system, a plurality of identical containers provided with lateral apertures are superimposed one on the other to create at least one vertical hollow column, provided at regular intervals along its axis with equidistant coplanar apertures (levels of culture) arranged for the insertion of plants. Means are provided for raising and lowering the column and for keeping it vertical, these means being in the form of a cable which is removably fixed to each individual container, and means for spraying nutrient liquid at the top of the column and collecting said liquid at the base, to recycle it to the top.

In said installation a cultivation method is provided consisting of placing the plants in the highest container, waiting a number of days equal to the culture time in days divided by the number of containers provided in the column, removing the lowest container from the column, lowering the column by a distance equal to the height of the removed container, placing a new empty container on top of the column, inserting new plants into this latter and repeating the operation until the first filled container reaches the column base with mature plants.

6 Claims, 9 Drawing Figures

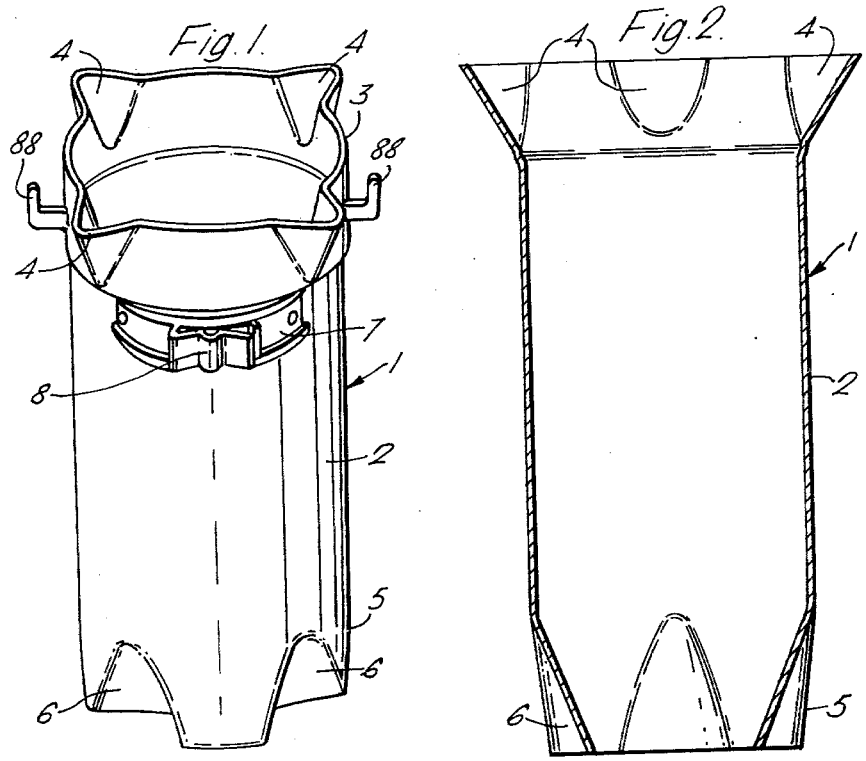
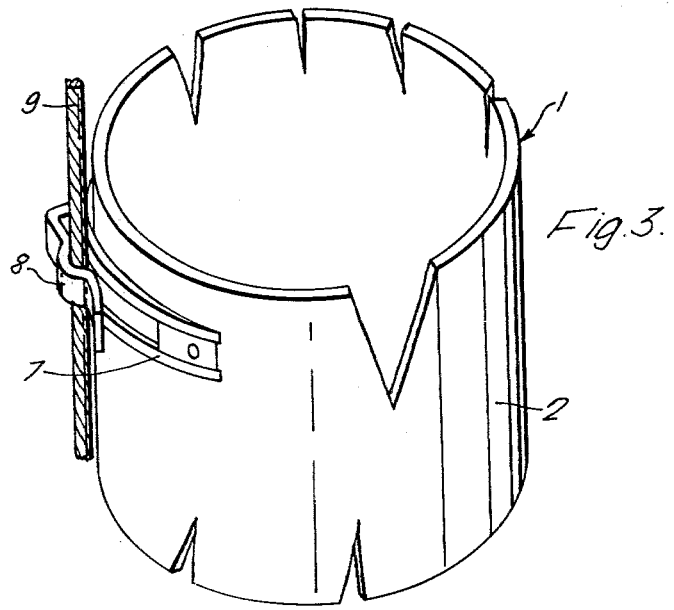

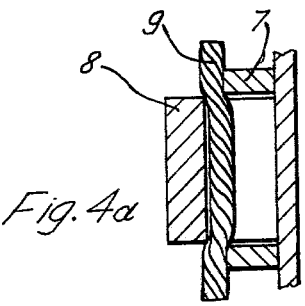
Fig. 4.
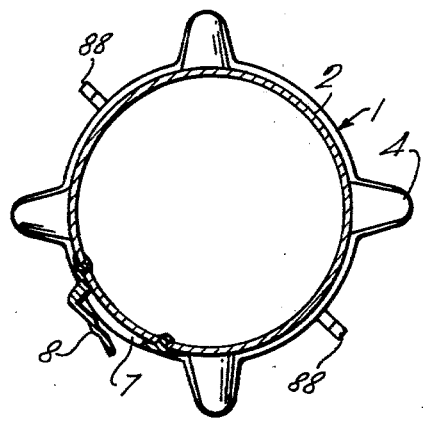
Fig. 4a.
Fig. 5.
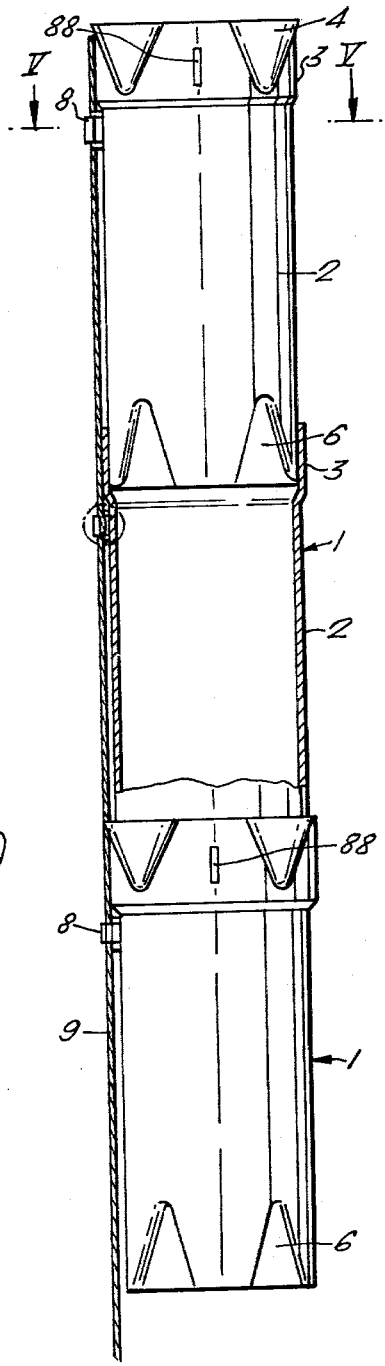

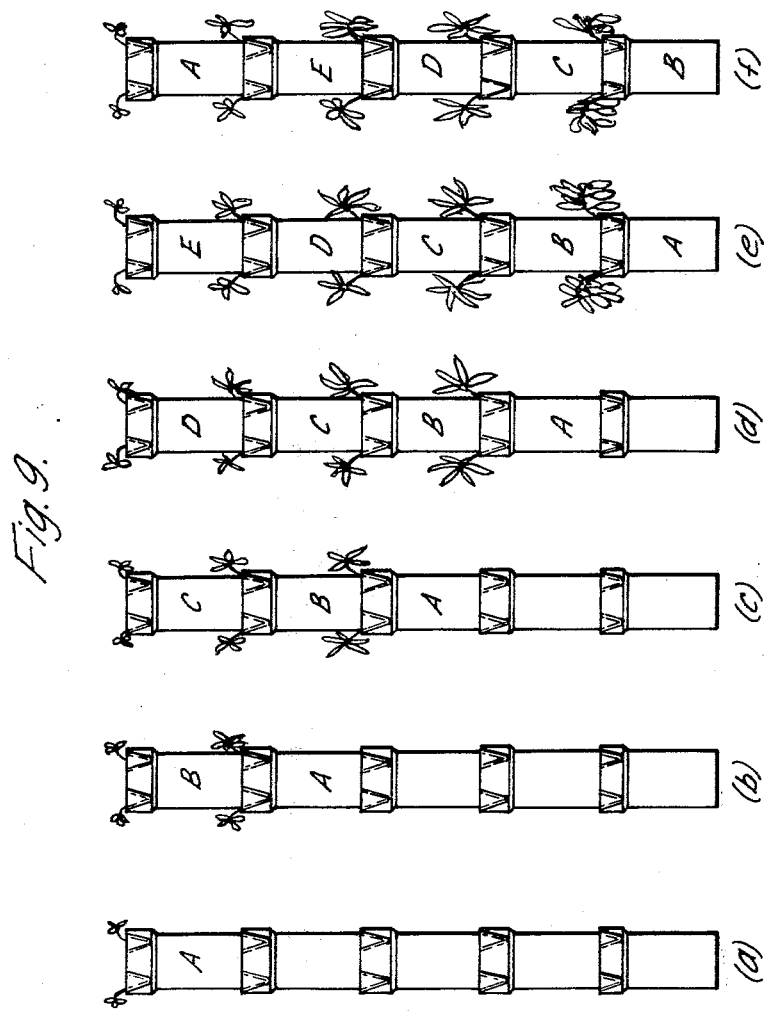

INSTALLATION AND METHOD FOR VEGETABLE CULTIVATION

SUMMARY OF THE INVENTION

This invention relates to an installation for intensive vegetable cultivation in a greenhouse, and in particular for plants in containers without an earth substrate, i.e. fed by a sprayed nutrient solution by a method of cultivation otherwise known as "hydroponic". The invention also relates to an improved hydroponic cultivation method for plants in containers, which can be carried out using the aforesaid installation inside greenhouses with a controlled atmosphere.

In modern cultural methods it is known to dispose in greenhouses, suitable containers provided with discharge holes at their base and openings at their top. The root of the plants to be cultivated is usually placed inside said containers, so that their foliage emerges from the openings at the top.

A nutrient environment is created inside said containers for the plant roots, consisting of a liquid which is vaporised, sprayed or simply fed into the container intermittently.

The holes provided in the base of the container can discharge said liquid so that it can be changed and possibly recycled after being possibly regenerated so as to restore its nutrient characteristics.

In the case of roots continuously immersed in the liquid, the liquid is obviously discharged for its possible replacement at predetermined intervals, whereas if the liquid is only sprayed into the container on to the roots, discharge is continuous over predetermined cycles.

This process provides a greenhouse cultivation method known as "hydroponic". However, in carrying out this method practically in the known manner, difficulties arise deriving from the correct metering of the nutrient liquid, its wastage, the excessive overall size of the relative equipment, and lastly the impossibility of giving the plants being cultivated an exact and sufficient exposure to light.

The need to expose the plant to light in itself leads to serious space problems. Although it is known that the light requirement reduces as the plants develop, these problems have not yet found a solution, so making the said hydroponic cultivation method uneconomical or unattainable in many cases.

On the other hand, the need to provide vegetable products during the whole of the year independently of the season, and in particular fruit and green vegetables, means that there is a definite requirement for a continuous cycle installation in which the product can be made available in required and programmable quantities, with a more or less continuous flow.

The need to provide continuous production methods for vegetables also derives from the impossibility of obtaining seasonal or even cyclical labour. In view of the improved constant utilisation of labour, this continuous production also leads to substantial cost reductions.

The present invention provides an installation which overcomes the aforesaid difficulties by providing an improved cultivation method which is both extremely efficient and economical on an industrial scale.

According to the invention, said installation comprises a plurality of containers each consisting of an outer open bottom casing of any shape, provided at its upper edge with suitable outwardly extending lips and corresponding inwardly extending depressions at its lower edge, and which can be stacked on identical containers by partly inserting one into another to form a column, at the surface of which the said lips and depressions form series of axially equidistant coplanar apertures communicating with the outside, and constituting a like number of culture planes.

The invention also provides suitable means for vertically supporting each pile of containers, these means being able to be raised and lowered, and to which each container is fixed individually and independently from the others of the same column.

The invention also provides means for spraying a nutrient solution into the highest container, means for collecting said solution at the bottom of the lowest container after it has traversed all the containers of one column, and means for recycling said solution, possibly after enrichment or regeneration, to the spray nozzles disposed on the highest container.

Furthermore, the engagement means between the individual containers constituting a single column and the support and raising means are such as to enable the lowest container to be easily removed, and to be fitted on top of the highest container. Likewise, the means for supporting, raising and lowering each pile of containers, or column, are at least such as to be able to support the entire column starting from the penultimate container at the bottom, and to be able to lower the entire column through steps equal to the height of one container.

An installation such as that described enables various fruit and vegetables, such as tomatoes, strawberries and similar plants, to be cultivated in a greenhouse or in the open in a suitable climate, by using an improved method comprising the following operations:

setting up at least one vertical column constituted by the said containers on support and raising means;

placing the said spray means for nutrient solution, of known type, at the top of the column or columns;

inserting the plants, taken from the seedling nursery, into the lips in the highest container, then removing the last container from the base of the column after a certain number of days substantially equal to the total number of days necessary for completing the culture divided by the number of containers constituting each column;

lowering the column by a distance equal to the height of the container;

inserting this latter into the top of the column in the space made available by said lowering, and lastly placing new plants into said container which is now at the top of the column;

repeating this process until the first container at the top, in which the first plants were placed, has reached the base of the column at the end of the production and maturing cycle.

The process can continue indefinitely in the same manner.

The aforesaid process described in relation to placing the plants at one level or into one container per time, can be carried out by placing the plants into a number of containers, or at a number of levels simultaneously. For example, the plants can be placed into the first two most upper containers, so occupying the two highest levels, the process then proceeding by removing the two lowest containers, then placing them on the top after lowering the column by a distance equal to the total height of two containers, and so on.

The merits and operational and constructional characteristics of the invention will be more apparent from the description given hereinafter of one preferred embodiment, illustrated by way of non-limiting example in the accompanying drawings in which:

FIG. 1 is a perspective view of a container;

FIG. 2 is an axial section through this latter on the plane of symmetry of the lips and depressions;

FIG. 3 is a perspective view of the means for coupling the container to its support cable;

FIG. 4 is a side view of three containers stacked one on the other to form a column portion;

FIG. 5 is a section on the line V—V of FIG. 4;

FIG. 9 shows the filling cycle for any one column of five containers which house plants having a cultivation cycle of 120 days, from the beginning to the end of the cycle.

Figure 6:
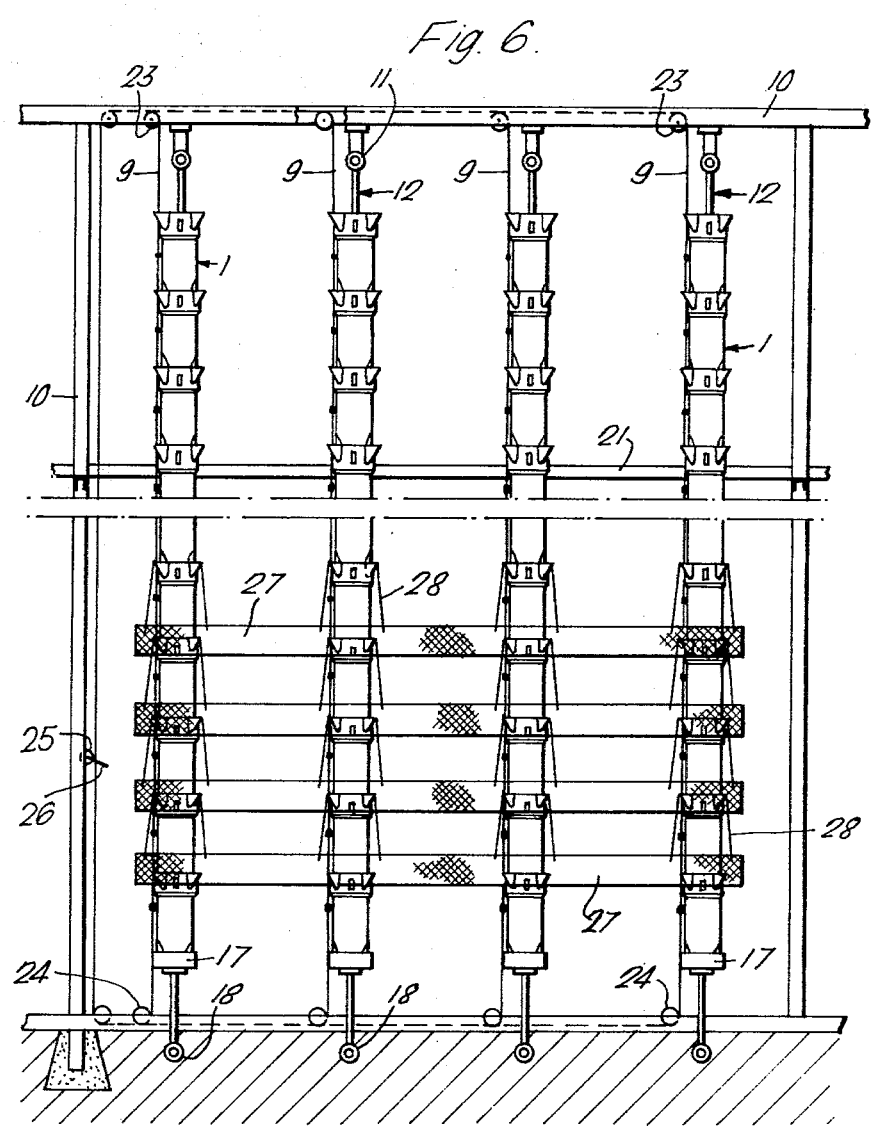
FIG. 6 is a modular portion of four columns forming part of a line of columns, and their support means, seen laterally.

FIGS. 1, 2 and 3 show a container 1 consisting of a middle cylindrical portion 2 and provided upperly with a short slightly flared portion 3 from which four lips 4 extend in equidistant symmetrical positions.

At its base, said container 1 tapers over a short portion 5 which comprises four depressions 6 aligned with the overlying lips 4.

Each container 1 comprises, immediately below the upper flared portion 3, a shaped plate 7 fixed by normal rivets or glued, and acting as a support for a shaped resilient tongue 8. As will be apparent hereinafter, a cable 9 is coupled between said plate 7 and said tongue 8 to act as support and raising means for a column of superimposed containers. Each container also comprises two external hooks 88 on the diameter orthogonal to that comprising the tongue 8, their purpose being explained hereinafter.

Said column, as stated, is constructed by partially inserting any number of containers one into the other as better illustrated in FIGS. 4 and 5, which show three containers 1 with their relative common support cable 9.

A plurality of parallel lines of vertical columns, each composed of a plurality of containers 1 inserted one into another as illustrated in FIG. 4, is disposed inside a building comprising insulated transparent walls to form a greenhouse and including the normal environmental conditioning means to ensure the required temperature and humidity.

Said building preferably has its axis running from north to south to give better exposure of the plants to light, and the lines of columns are parallel to this axis.

As the building can obviously be constructed in an infinite number of ways, all normal, only the internal equipment of the building will be described here.

It is also apparent that in particularly favourable climates, said equipment can be disposed in the open.

It consists (FIGS. 6, 7 and 8) of a framework of sections 10 which define the lines parallel to the north-south axis of the building or greenhouse. Said framework 10 supports a network of pipes 11 from which the spray nozzles 12 branch downwards, one for each column of superimposed containers.

Each of said spray nozzles (FIG. 8) consists of a pipe 13 closed at its end by a plug 14 and with its wall provided with small bores 15. Said pipe 13, which is resilient, also supports a disc 16 which partly closes the top of the highest container 1 of the column, and acts inter alia as a support for the stems of the plants placed in the container.

On the floor of each building below each column of containers there is disposed a cup-like support 17, the base of which is connected to a discharge manifold 18. Said cup-like support 17 collects the liquid percolating through the column of superimposed containers resting on the support.

Figure 7:
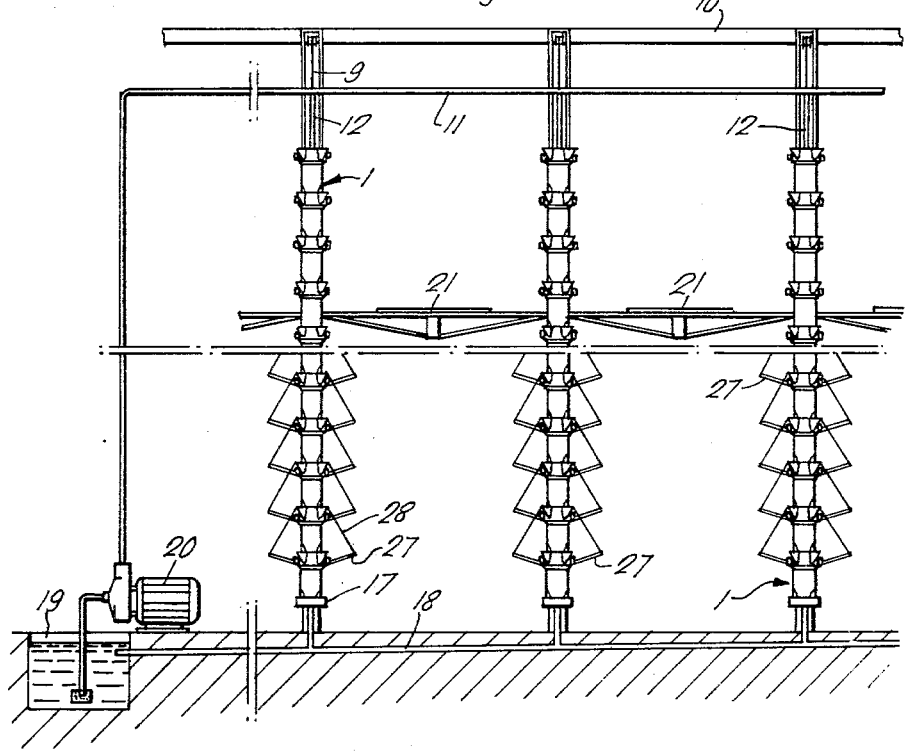
FIG. 7 is a front view of various lines.
Figure 8:
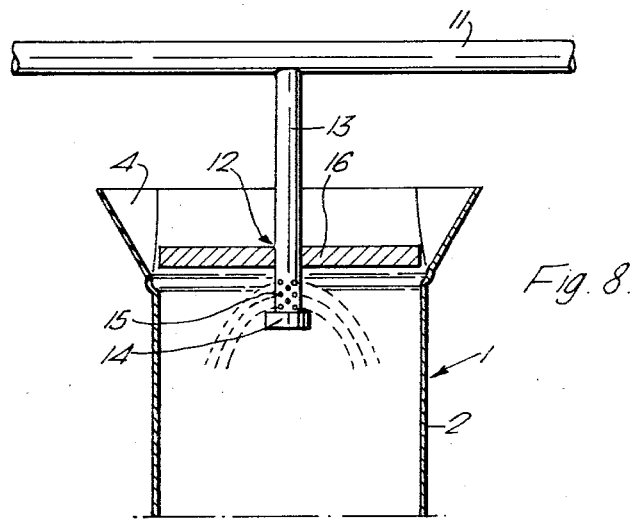
FIG. 8 is an enlarged view of the spray nozzle at the top of each column.

The manifold 18 collects the liquid from at least all the columns of the same line of columns, and forms part of a network of manifolds covering the entire building or greenhouse, which discharges the collected liquid into a tank 19 (FIG. 7).

The liquid is withdrawn from the tank 19 by one of more pumps 20, and is continuously recycled thereby to the network of pipes 11 and their spray nozzles 12.

The framework 10 also supports at man height a series of gangways 21 which run along the corridors between one line of columns and the next.

The purpose of the gangways 21 is to facilitate the manual handling of the containers 1 disposed in the upper part of the respective columns of containers.

As can be seen from FIGS. 6 and 7, all the containers of any one column are fixed by the respective resilient tongues 8 and plates 7 to a cable 9, which is stretched between two pulleys 23 and 24 fixed respectively to the framework 10 and floor of the building.

The cables 9 of one or more columns forming part of the same group of columns used for the same culture are connected via further idle pulleys to a winch 25 which is operated by the crank 26 and provided with suitable locking means, to progressively lower the column or columns of the same group as the culture progresses.

In the example illustrated, a group of columns is constituted by a longitudinal line of four columns.

At each level of culture where rendered necessary by the volume of the plants or by the weight of the fruit, each group of columns supports an inclined rectangular mesh 27 which at its base is mounted on coplanar hooks 88, and at its top is supported by hook tie bars 28 which are connected to the edge of containers of the higher level.

The improved method already defined in the initial part of the present patent can be carried out using an installation such as that described.

FIG. 9 shows the successive progressive filling or loading of any one column as the improved cultivation method is carried out.

By way of example, the method is described for plants having a culture cycle of 100 days, carried out over at least one column of containers of five levels of culture, i.e. formed by superimposing five containers.

For said culture, the plants are inserted into the first container A at the top of the column (FIG. 9a).

After 20 days, the lowest container is removed from the column, it is inserted into the top after lowering the column by a distance corresponding to the height of one container, and new plants are inserted into said container B (FIG. 9b). This procedure is repeated at intervals of 20 days until all five containers of the column A-B-C-D-E are full.

After carrying out the last of these operations, a further 20 days are allowed to pass to complete the maturation cycle, after which as the required 100 days have passed, the fruit can be collected at the base of the column directly from the plants of container A which at the beginning of the cycle was at the top (FIG. 9e). After collecting, the usual operation is repeated, and the column, completely filled with plants, assumes the configuration of FIG. 9f. The cycle can obviously continue indefinitely, taking action every 20 days, the plants in each container then maturing every 100 days.

Experiments carried out on tomato plants have shown that in an installation in which the lines of columns are spaced apart by approximately 2 meters and in which the columns of each line are spaced apart by approximately 50 cm and having ten levels of culture, production is of the order of 140–160 kg/m$^2$ per annum, and up to 180 kg/m$^2$ under particularly favourable conditions, with a specific water consumption of approximately 20 liters/kg of product.

Production is in fact more than three times that obtainable in hydroponic cultivations conducted using conventional systems, and water consumption is greatly reduced.

The labour requirement is two persons per 2000 m$^2$ of culture when viewed in plan.

A further advantage of the invention is the complete elimination of Nematoda, which cannot survive with the proposed system, and which at present lead to production losses of 15–20%.

What is claimed is:

1. An installation for the hydroponic cultivation of vegetables in the form of plants, comprising:
    at least one column consisting of a plurality of bottomless hollow containers 1 inserted one into another and provided with suitable apertures 4 into which the plants are inserted;
    means 8, 9 for supporting the column of containers in a vertical position by engaging each container individually, and arranged to raise or lower said column;
    means 14, 15 for spraying at the top of the column a nutrient liquid of known type as usually used in hydroponic cultivation;
    basin-type support means 17 for collecting said liquid at the base of each column, and at the same time supporting this latter;
    manifold means 19 for the liquid and pumping means 20 for its recycling.

2. An installation as claimed in claim 1, wherein each container 1 constituting the column consists of a central cylindrical portion 2 having any cross-section, an upper flared portion 3 comprising outwardly projecting lips 4 in its edge, a lower tapered portion 5 comprising inwardly extending depressions 6 which are aligned axially with the overlying outwardly extending lips, the depressions and lips corresponding with each other when one container is partly inserted into the other, to form an aperture for inserting the plant.

3. An installation as claimed in claim 1, wherein each container carries a fixed resilient tongue 8 on its central cylindrical portion, for clamping to a cable 9.

4. An installation as claimed in claim 1, wherein each container has two opposing hooks 88 fixed to its outside on the diameter orthogonal to the diameter comprising the clamp, for fixing a mesh 27 for supporting the fruit and the foliage of the plants.

5. An installation as claimed in claim 1, wherein the means for vertically supporting, raising or lowering each column of containers consist of an endless cable 9 extending between suitable pulleys and comprising at least one vertical portion having a length greater than the axial dimension of the column, and to which all the containers 1 are individually clamped by means of the respective resilient tongues 8, there being provided winch means 25 on the cable to move it and lock it in position.

6. An improved method for vegetable cultivation in a cultivation installation as claimed in any one of claims 1 to 5, and as heretofore described, comprising the following operations:
    inserting one or more plants at the highest level of a column traversed by percolating liquid cultivation nutrient;
    allowing a number of days to pass equal to the number of days of the cultivation and maturation cycle for the fruit divided by the number of cultivation levels or superimposed containers in the column;
    removing the lowest container of the column;
    lowering the column through one level;
    inserting an empty container into the top of the column;
    inserting the next new plants;
    repeating the operation until the first container full of plants is at the base of the column with the plants mature;
    proceeding with the cycle indefinitely.

* * * * *